United States Patent Office 3,148,201
Patented Sept. 8, 1964

3,148,201
POLYFLUOROALKYL-SUBSTITUTED POLYSILOXANES
John H. Fassnacht, New Castle, Del., assignor to E. I. du Pont de Nemours and Company, Wilmington, Del., a corporation of Delaware
No Drawing. Filed Sept. 13, 1961, Ser. No. 137,718
14 Claims. (Cl. 260—448.2)

This invention relates to novel polyfluoroalkyl-substituted polysiloxanes and to processes for making them.

Polysiloxanes are well known substances which have been proposed for use as lubricants. However, such polysiloxanes, particularly the poly(dimethyl siloxanes), have been found to be poor lubricants, particularly under high loads.

It has been proposed, e.g. Warrick in U.S. Patent 2,958,707, to improve the lubricity of polysiloxanes and particularly their ability to carry increased loads by reacting them with olefinic compounds, e.g. trifluorochloroethylene, in the presence of a free radical generator under conditions such that a telomerization reaction takes place in which the olefinic compound adds onto the alkyl radicals of the polysiloxane, frequently with some polymerization of the olefinic compound to form polymeric chains which may also be added onto the alkyl groups of the polysiloxane.

Particularly, when linear poly(dimethyl siloxanes) are treated in this manner with a polyfluoroolefine, there are obtained complex mixtures of compounds in which polyfluoroalkyl groups are added at random to the methyl groups of the polysiloxane and the number, size, and position of the polyfluoroalkyl groups cannot be controlled. All of the available evidence indicates that the methyl groups, regardless of position, have equal probability of reacting with the olefine and, except that it is less likely that the two methyl groups attached to the same intermediate silicon atom will both react, reaction can occur anywhere along the polysiloxane chain. It is highly improbable that the polyfluoroalkyl groups will be spaced at regular intervals along the chain. The products in the mixture contain widely varying numbers of polyfluoroalkyl groups, and the polyfluoroalkyl groups will generally be present as long chains and few in number. Also, the mixture will contain a significant proportion of compounds containing substituted trimethylsilyl terminal groups at one or both ends. While such polyfluoroalkyl-substituted linear poly(dimethyl siloxane) compounds have improved lubricating properties over the unsubstituted linear poly(dimethyl siloxanes), they fail to have the lubricity required for many purposes and particularly do not have the ability to carry high loads.

Furthermore, the products obtained from chlorotrifluoroethylene contain substantial amounts of chlorine which is relatively easily released from the compounds to produce corrosive products.

It is an object of this invention to provide novel polyfluoroalkyl-substituted linear polysiloxanes. Another object is to provide polyfluoroalkyl-substituted linear polysiloxanes which have improved lubricity and, particularly, the capacity to carry high loads. Other objects are to provide new and improved methods for producing polyfluoroalkyl-substituted linear polysiloxanes, and particularly for producing mixtures of polyfluoroalkyl-substituted linear polysiloxanes of more uniform composition and improved porperties. Other objects are to provide new compositions of matter and to advance the art. Still other objects will appear hereinafter.

The above and other objects may be accomplished in accord with this invention which comprises compositions consisting essentially of at least one polyfluoroalkyl-substituted linear polysiloxane consisting of a polymer chain of from 2 to about 30 repeating units each of which consists of $x$ groups of the formula

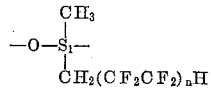

and $y$ groups of the formula

wherein $n$ is an integer of from 1 to 5, $x$ is an integer of from 1 to 2, the sum of $x$ and $y$ is an integer of from 3 to 4, and the average value of $nx$ is from 1 to 5, which chain is terminated at one end by a $(CH_3)_3Si$—group attached to oxygen and at the other end by a $$-O-Si(CH_3)_3$$

group attached to silicon; and to the process for preparing such compositions which comprises treating at least one polyfluoroalkyl-substituted cyclicpolysiloxane which consists of $x$ groups of the formula

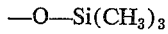

and $y$ groups of the formula

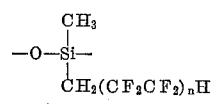

wherein $n$ is an integer of from 1 to 5, $x$ is an integer of from 1 to 2, the sum of $x$ and $y$ is an integer of from 3 to 4, and the average value of the product of $nx$ is from 1 to 5, with a concentrated aqueous strong nonoxidizing inorganic acid at a temperature of from about 25° C. to about 150° C. to cleave the ring of the cyclicpolysiloxane and cause the cleaved products to form polymer chains, and reacting the polymeric product with from about 0.01 to about 0.1 mole of a member of the group consisting of trimethyl chlorosilane and hexamethyldisiloxane at a temperature of from about 90° C. to about 110° C., and recovering from the reaction mixture the desired polyfluoroalkyl-substituted linear polysiloxanes.

By employing polyfluoroalkyl-substituted cyclicpolysiloxanes of the specified class and treating them by the process of this invention, the cyclic ring is split (cleaved) between siloxane groups to provide open chain divalent radicals which combine with each other to form polymer chains containing repeating units of such radicals, which chains contain unsubstituted trimethyl siloxane terminal groups at both ends of the chains, such terminal groups being formed by reaction of the poylmer chains with trimethyl chlorosilane or hexamethyldisiloxane. Also, by such process, the number, size, and position of the polyfluoroalkyl groups on the polymer chain can be preselected and controlled, and the final molecular weight of the products can be tailored to meet the requirements of desired specific applications. The products have an ordered structure with a relatively large number of polyfluoroalkyl groups of limited size spaced at regular intervals along the polymer chain and separated on the average from the next such group by a regular, consistent number of unsubstituted dimethyl siloxane groups, and with the terminal silicon atoms carrying only unsubstituted methyl groups. Also, by such process, it is possible to control the molecular weight of the products and obtain compositions of more uniform molecular weight. The products are liquids at normal atmospheric temperatures. Due to their structure, the compositions so produced have excellent lubricating properties and the ability to carry high loads and, in this respect, are far superior to the products which can be obtained by the reaction of tetrafluoroethylene with unsubstituted poly(dimethyl siloxanes) in the presence of a free radical generating catalyst.

The polyfluoroalkyl-substituted cyclicpolysiloxanes which are employed in the process of this invention are readily prepared by the reaction of tetrafluoroethylene with octamethylcyclotetrasiloxane ($x+y=4$), or hexamethylcyclotrisiloxane ($x+y=3$), or a mixture of both, in the presence of a free radical generating telomerization catalyst by known methods, such as those disclosed by Warrick in U.S. Patent 2,958,707. Such cyclicpolysiloxanes and such catalysts are well known to the art.

Preferably, from about 0.2 to about 20 parts by weight of the cyclicpolysiloxane and from about 0.2 to about 3 parts by weight of tetrafluoroethylene are mixed and reacted in the presence of from about 0.05% to about 3% by weight of an organic peroxide catalyst, preferably di-tert.-butyl peroxide, at a temperature from about 70° C. to about 250° C., depending upon the peroxide used. With di-tert.-butyl peroxide as the catalyst, the temperature preferably will be from about 120° C. to about 160° C. The reaction may be carried out with or without a solvent which is inert or substantially inert under the conditions employed, i.e. inert to free radical attack under those conditions. Suitable solvents include benzene, trifluorotrichloroethane, tetrafluoroethane, dichlorodifluoromethane, and the like. Trifluorotrichloroethane apparently does not react under the preferred conditions, and is generally preferred.

Usually, a mixture of reaction products is obtained, the composition of which depends on the exact reaction conditions used. In general however, $n$ in the

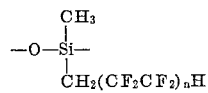

groups will vary between one and about five and $x$ from one to two. Usually also, only one of the methyl groups attached to each silicon atom undergoes reaction, but methyl groups on more than one silicon atom may and often do react. Thus, the product will contain simple substitution products, such as

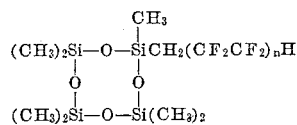

and more complicated products, such as

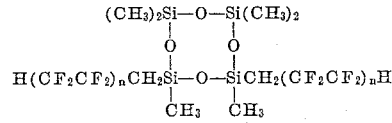

and

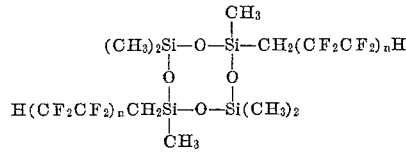

Similar products are obtained from hexamethylcyclotrisiloxane.

Unreacted starting materials, solvents, catalysts, and the like, will be removed from the reaction mixture. If the resulting mixture consists essentially of polyfluoroalkyl-substituted cyclicpolysiloxanes of the class wherein $n$ is an integer of from 1 to 5, $x$ is an integer of from 1 to 2, the sum of $x$ and $y$ is an integer of from 3 to 4, and the average value of the product of $nx$ is from 1 to 5, they may be used directly in the process of this invention.

If the mixture contains significant amounts of products which do not come within such formula, then the desired polyfluoroalkyl-substituted polysiloxanes should be separated therefrom by fractional distillation. Even when the mixture consists essentially of compounds of the above class, it is usually preferred to subject the mixture to fractional distillation to recover fractions of more uniform composition, particularly in the number and size of the polyfluoroalkyl groups, and thereby control more precisely the constitution of the products of this invention.

According to the process of this invention, polyfluoroalkyl-substituted cyclicpolysiloxanes of the above specified class are treated with a concentrated aqueous strong non-oxidizing inorganic acid to cleave the ring of the cyclicpolysiloxane and thus produce open chain divalent radicals which combine with each other to form polymer chains which are then reacted with trimethylchlorosilane or hexamethyldisiloxane so as to terminate the polymer chain with unsubstituted trimethylsiloxane groups. From 2 to about 30 of the divalent radicals combine to form the polymer chains whereby the products contain from 2 to 30 repeating units corresponding to such radicals and have molecular weights of from about 1,000 to about 20,000. Usually, the products contain an average of from about 4 to about 15 of the repeating units and have an average molecular weight of from about 2,000 to about 10,000.

In the cleavage of the polysiloxane ring, the cleavage may take place between two unsubstituted dimethylsiloxane groups (where they are present); between an unsubstituted dimethylsiloxane group and a polyfluoroalkyl-substituted dimethylsiloxane group; or between two adjacent polyfluoroalkyl-substituted dimethylsiloxane groups (where they are present); in each case providing a radical which consists of $x$ groups of the formula

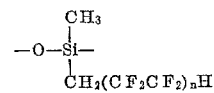

and $y$ groups of the formula

with the order of the polyfluoroalkyl-substituted groups and the unsubstituted groups in the radicals varying according to the point of cleavage of the ring. For example, where $x$ is 1 and $y$ is 3, the radicals will have the formula

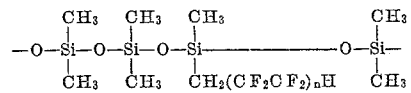

and

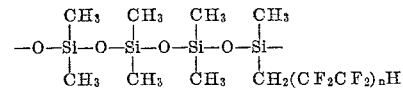

where $x$ is 2 (adjacent) and $y$ is 2, the radicals will have the formula

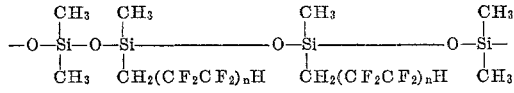

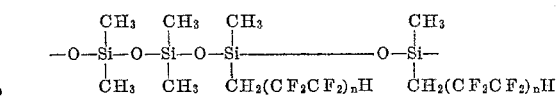

and

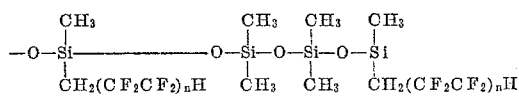

Where $x$ is 2 (nonadjacent) and $y$ is 2, the radicals will have the formula

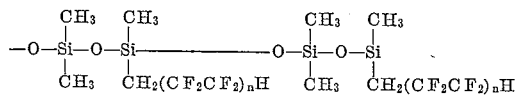

It is not known with certainty where the cleavage takes places with any particular polyfluoroalkyl-substituted cyclicpolysiloxane, it does not appear that cleavage takes place preferentially at any particular one of the possible points of cleavage, and it is believed that all of the possible radicals are present in the cleaved product. The radicals, containing the different order of the various siloxane groups, appear to be equivalent and they appear to combine in an orderly fashion to form the linear polymer chains. Such linear polymer chains, containing the repeating units of such radicals necessarily contain the polyfluoroalkyl-substituted siloxane groups spaced along the chain in a regular orderly manner.

A strong nonoxidizing inorganic acid is required for cleavage of the cyclicpolysiloxane rings, the term "strong acid" being used in its usual sense to mean one which

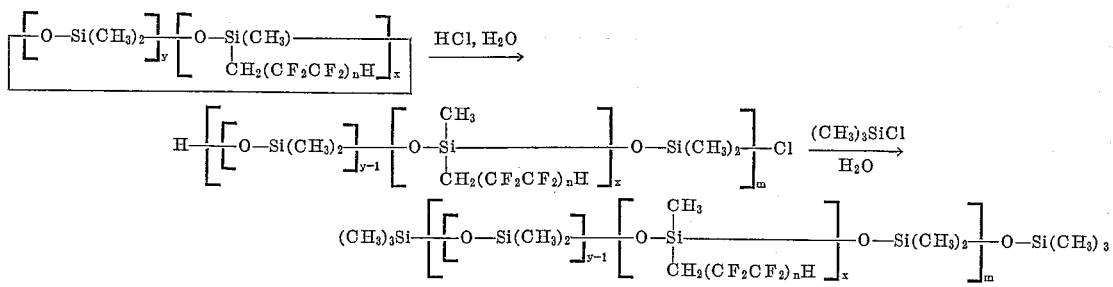

is highly ionized in dilute aqueous solution. Oxidizing acids are not suitable. Since water is required in the reaction, an aqueous acid is required, but it should be concentrated. Suitable acids are concentrated hydrochloric acid; concentrated hydrobromic acid; sulfuric acid of from about 75% to about 90% concentration; and phosphoric acid of from about 70% to about 80% concentration. Ordinarily, the acid will be employed in a proportion of from about 4% to about 100% by weight of the polyfluoroalkyl-substituted cyclicpolysiloxane. Much larger amounts of acid can be employed, but are unnecessary and usually uneconomical.

The cleavage of the cyclicpolysiloxanes will generally be carried out at temperatures of from about 25° C. to about 150° C. The reaction temperature controls the reaction rate, but has little other effect so long as it does not exceed reasonable limits, e.g. about 150° C. With acids containing volatile components such as hydrochloric acid or hydrobromic acid, it will be preferred to employ temperatures of from about 25° C. to about 40° C at atmospheric pressure. However, higher temperatures can be employed with higher pressures. With the nonvolatile acids such as sulfuric acid or phosphoric acid, it will generally be preferred to employ a temperature of from about 95° C. to about 100° C. at atmospheric pressure.

After the cyclicpolysiloxane has been cleaved with concentrated hydrochloric acid or concentrated hydrobromic acid, the product is separated from the acid and is mixed with trimethylchlorosilane and water with stirring, employing from about 0.01 to about 0.1 mole of trimethylchlorosilane per mole of polyfluoroalkyl-substituted cyclicpolysiloxane originally employed. The average molecular weight of the product is controlled by the amount of trimethylchlorosilane employed, the molecular weight being inversely proportional to the amount of trimethylchlorosilane. The resulting product is a mixture of the compounds of this invention having a range of molecular weights greater than is usually desired. Therefore, it is usually preferred to heat it for a short time at a temperature of from about 90° C. to about 110° C. with aqueous sulfuric acid of a concentration of from about 75% to about 90%, whereby the molecular weight of the product will be caused to equilibrate to a more uniform molecular weight distribution. The reactions apparently taking place in the conversion of the cyclicpolysiloxanes to the products of this invention are illustrated by the following equations, wherein $x+y=4$ and the cleavage of the ring is between two unsubstituted dimethylsiloxane groups:

wherein $m$ is an integer of from 2 to about 30.

When the polyfluoroalkyl-substituted cyclicpolysiloxanes are cleaved by treatment with sulfuric acid or phosphoric acid, it will usually be preferred to have hexamethyldisiloxane present in the proportion of from about 0.01 to about 0.1 mole per mole of the cyclicpolysiloxane. In this case also, the average molecular weight of the product is controlled by the amount of hexamethyldisiloxane employed, the molecular weight being inversely proportional to the amount of hexamethyldisiloxane. This procedure yields a product of uniform molecular weight distribution directly and therefore is usually preferred to the procedure employing hydrochloric acid or hydrobromic acid and trimethylchlorosilane. The reactions apparently taking place in this procedure are illustrated by the following equations in the case where $x+y=4$ and the cleavage of the cyclic ring takes place between two unsubstituted dimethylsiloxane groups:

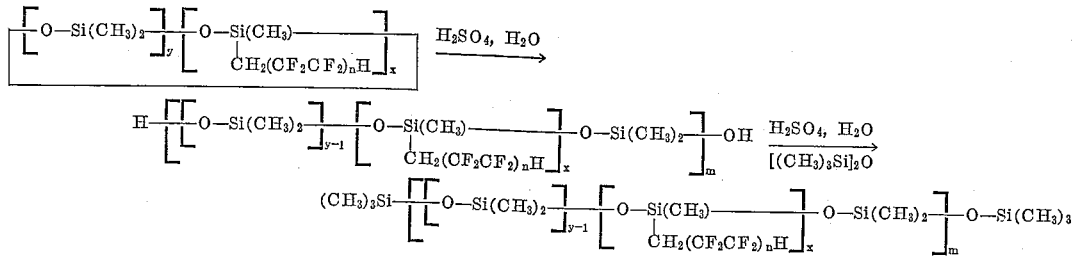

wherein $m$ is an integer of from 2 to about 30.

In order to more clearly illustrate this invention, preferred modes of practicing it and the advantageous results obtained thereby, the following examples are given.

EXAMPLE 1

A. One hundred parts of octamethylcyclotetrasiloxane, 50 parts of 1,1,2-trichlorotrifluoroethane and 2 parts of di-tert.-butyl peroxide were charged into a pressure vessel which was free of oxygen. Tetrafluoroethylene was added in portions to the mixture heated at 130° C. until 50 parts had been added. Each portion was added after the preceding portion had been consumed as indicated by the pressure drop. The liquid product was separated from a small amount of solid present and distilled under reduced pressure, giving the following fractions (exclusive of starting materials):

| Fraction | b.p., °C./mm. Hg | Parts |
|---|---|---|
| 1 | 108–122/50 | 11 |
| 2 | 128–130/30 | 10.5 |
| 3 | 123–131/8 | 7.8 |
| 4 | 135–158/8 | 15 |
| 5 | 94–95/0.5 | 6.8 |
| Residue | | 17.0 |

Fractions 1, 3 and 5 were analysed for fluorine, giving the following results:

| Fraction | Percent F | Average C₂F₄ Units |
|---|---|---|
| 1 | 10.4 | (About ½ C₂F₄ unit.) |
| 3 | 36.8 | (About 3 C₂F₄ units.) |
| 5 | 48.9 | (About 4 C₂F₄ units.) |

Analysis of the products for chlorine gave a negative result.

B. One hundred fifty parts of octamethylcyclotetrasiloxane, 50 parts of 1,1,2-trichlorotrifluoroethane, 6 parts of di-tert.-butyl peroxide and 50 parts of tetrafluoroethylene were caused to react in the same manner as above at 130° C.

Six such runs were combined and distilled at reduced pressure, giving the following fractions (exclusive of starting materials):

| Fraction | b.p., °C./mm. Hg | Parts |
|---|---|---|
| 1 | 108–118/47 | 18.4 |
| 2 | 118/47 | 79.6 |
| 3 | 123–130/47 | 56.2 |
| 4 | 130–138/47 | 19.8 |
| 5 | 138–145/47 | 70.8 |
| 6 | 125–140/20 | 41.8 |
| 7 | 140–152/20 | 58.8 |
| 8 | 153–165/20 | 50.9 |
| 9 | 170–190/20 | 34.4 |

Fractions 2, 5, 8 and 9 were analysed with the following results:

| Fraction | Percent C | Percent H | Percent Cl | Percent F | Average C₂F₄ Units |
|---|---|---|---|---|---|
| 2 | 32.3 | 7.3 | 0 | 8.9 | (About ½ C₂F₄ unit.) |
| 5 | | | 0 | 25.7 | (About 1.5 C₂F₄ units.) |
| 8 | 28.6 | 3.8 | 0 | 40.9 | (About 3.5 C₂F₄ units.) |
| 9 | 28.6 | 3.5 | 0 | 43.7 | (About 4 C₂F₄ units.) |

Vapor phase chromatography of fractions 8 and 9 indicates that each contains two major components (the same) and at least seven minor components (generally the same). None of the components were further identified.

EXAMPLE II

An agitated pressure vessel is filled with a 1% solution of di-tert.-butyl peroxide in octamethylcyclotetrasiloxane and heated to 190° C. A 1% solution of di-tert.-butyl peroxide in octamethylcyclotetrasiloxane, and tetrafluoroethylene are fed separately under pressure continuously into the reactor. The mole ratio of tetrafluoroethylene to octamethylcyclotetrasiloxane is controlled at approximately one to one. Product is discharged continuously from the reactor through a pressure control device which maintains the reaction pressure at 450 p.s.i.g.

The discharged liquid product is purified by fractional distillation and gives the following fractions:

Fraction 1, B.P. 108° C. at 41 mm., 24 wt. percent. Analysis: C, 30.6; H, 6.4; F, 16.1.

Fraction 2, B.P. 124° C.–128° C. at 36 mm., 15 wt. percent. Analysis: C, 29.65; H, 5.2; F, 29.25.

Fraction 3, B.P. 117° C.–131° C. at 17 mm. Hg, 10 wt. percent. Analysis: C, 29.15; H, 5.0; F, 30.35.

Fraction 4, B.P. 124° C.–133° C. at 8.5 mm., 15 wt. percent. Analysis: C, 28.8; H, 4.1; F, 37.65.

Fraction 5, B.P. 131° C.–141° C. at 8 mm. Hg, 10 wt. percent. Analysis: C, 28.15; H, 3.7; F, 40.05.

Fraction 6, B.P. 142° C.–151° C. at 8 mm., 9 wt. percent. Analysis: C, 27.7; H, 3.3; F, 43.15.

Fraction 7, B.P. 156° C.–158° C. at 8 mm., 9 wt. percent. Analysis: C, 27.35; H, 3.1; F, 47.65.

Fraction 8, B.P. 148° C.–160° C. at 2 mm., 8 wt. percent. Analysis: C, 27.1; H, 2.8; F, 47.8.

*Calculated Values for Telomers*

| OMCTSO [1] | C₂F₄ | Calculated Analysis |
|---|---|---|
| 1 | 1 | C, 30.31; H, 6.06; F, 19.20. |
| 1 | 2 | C, 29.03; H, 4.84; F, 30.64. |
| 1 | 3 | C, 28.19; H, 4.03; F, 38.26. |
| 1 | 4 | C, 27.58; H, 3.45; F, 43.69. |
| 1 | 5 | C, 27.14; H, 3.15; F, 47.74. |

[1] Octamethylcyclotetrasiloxane.

From the above data, fraction 1 appears to be primarily

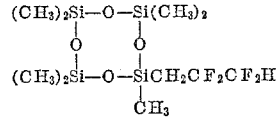

A combination of the above analytical data and nuclear magnetic resonance data indicates that fraction 2 contains 12% hexamethylbis(2,2,3,3-tetrafluoropropyl)cyclotetrasiloxane wherein the —CH₂CF₂CF₂H groups are attached to different silicon atoms, 82% of

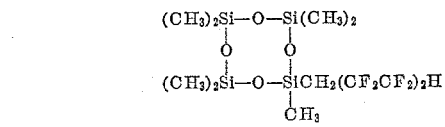

and 6% of other telomers. Fraction 3 contains 68% of the same hexamethylbis(2,2,3,3-tetrafluoropropyl)cyclotetrasiloxane as fraction 2, 2% of the compound of fraction 2 containing the CH₂(CF₂CF₂)₂H group and 30% of other telomers. Fraction 4 contains 24% compounds containing —CH₂CF₂CF₂H groups, 37% compounds containing —CH₂(CF₂CF₂)₂H groups and 39% compounds containing —CH₂(CF₂CF₂)ₙ—H₂ groups where $n$ is greater than 2. Fraction 5 has an average composition of about 3.5 tetrafluoroethylene groups per molecule as a mixture of several species as described above. Fractions 6, 7 and 8 have average compositions of 5 tetrafluoroethylene units per molecule, each fraction being a mixture of several species, some of which contain the groups —CH₂(CF₂CF₂)₃H, —CH₂(CF₂CF₂)₄H and

—CH₂(CF₂CF₂)₅H

Hexamethylcyclotrisiloxane may be substituted for octamethylcyclotetrasiloxane in the above example giving a similar series of telomer products.

EXAMPLE III

A. 85 parts of the telomer mixture of fractions 8 and 9 of B. of Example I, and containing an average of 3.76 tetrafluoroethylene units per molecule and thus containing species with the groups —CH₂(CF₂CF₂)ₙH wherein $n$ is mainly 3 and 4, and 74 parts of concentrated hydrochloric acid are stirred together at room temperature for 8 hours. After separating the aqueous layer, 8 parts of trimethylchlorosilane is dissolved in the reaction product and this solution is added to 300 parts of water and stirred rapidly for three hours at 95° C. The siloxane is then separated from the water and stirred for 2 hours rapidly with 2.7 parts of 85% sulfuric acid at 90° C.

The mixture is then cooled, ether is added and the ether solution is separated from the sulfuric acid. After washing with sodium bicarbonate solution until neutral and then water, the ether solution is dried over anhydrous magnesium sulfate and filtered. The ether is evaporated and the resulting oil devolatilized by refluxing at 100° C. at 0.03 mm. Hg pressure. The resulting oil is a colorless liquid having a viscosity index of 70. It is a mixture of products having the formula

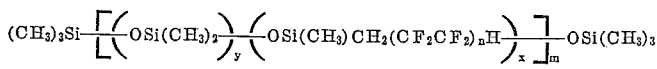

wherein the sum of $x+y$ is 4 and the product of $x$ and $n$ has an average value of 3.76; the average value of $m$ is approximately 4.5.

*Analysis.*—Found: C, 28.2; H, 3.5; F, 40.4.

B. When a telomer mixture of fractions 1, 2 and 5 of A. of Example I, containing an average of 1.5 tetrafluoroethylene units per molecule, is used in the procedure described above, a product is obtained having the formula

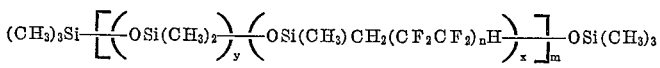

wherein the sum of $x+y$ is 4 and the average value of the product of $n$ and $x$ is 1.5; the average value of $m$ is approximately 4.5.

EXAMPLE IV 85 parts of the same telomer product as used in A. of Example III, containing an average of 3.76 tetrafluoroethylene units per molecule, 2.3 parts of hexamethyldisiloxane and 5 parts of 85% sulfuric acid are mixed and heated for twenty hours at 100° C. Ether is then added, the ether solution is separated from the sulfuric acid, washed with sodium bicarbonate solution until neutral then water, dried over anhydrous magnesium sulfate and evaporated. The resulting oil is devolatilized by refluxing at 100° C. at 0.03 mm. Hg pressure. The resulting product has the same physical properties and analyses as the product described in A. of Example III.

EXAMPLE V

A. 500 parts of a telomer fraction of the product of Example II, having an analysis of C, 29.25; H, 5.05 and F, 28.1 which indicates an average of about 2 tetrafluoroethylene units per molecule of octamethylcyclotetrasiloxane, 5 parts of hexamethyldisiloxane and 18 parts of 85% sulfuric acid are heated together at 95° C. for 6 hours. After isolating the product in the same manner as Example IV, 369 parts of oil are obtained of the approximate formula

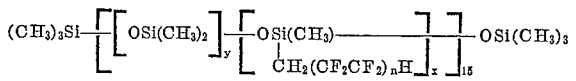

where the average value of $(nx)$ is two.

*Analysis.*—C, 29.65; H, 4.8; F, 28.35.

B. In the same manner, 500 parts of a telomer fraction of the product of Example II, having an analysis of C, 28.15; H, 3.7 and F, 38.9 containing an average of 3 tetrafluoroethylene units per molecule, 3.2 parts of hexamethyldisiloxane and 18 parts of 85% of sulfuric acid are heated for 6 hours at 95° C. The product, isolated as above, has the approximate formula

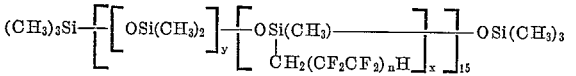

wherein the sum of $x+y$ is 4 and the average value of the product of $n$ and $x$ is 3.

*Analysis.*—C, 28.4; H, 3.85; F, 39.85.

EXAMPLE VI

The products of the present invention are shown to be useful lubricants by the "Falex" Test and the "Shell Four Ball" Test. The "Falex" Test is fully described by Ellis in "Lubricant Testing," Sci. Publications, Great Britain, 1953, p. 153. The test, in very simple terms, consists of lubricating a shaft rotating between two V blocks. The pressure on the V blocks is increased until seizure or severe scoring occurs, indicating that the lubricant has failed. The failure pressure is a means of comparing various lubricants.

The "Shell Four Ball Test" is fully described in "Federal Test Method Standard No. 791, General Services Administration Method No. 6503."

The results of these tests on representative samples of the products of this invention, e.g. from Examples III and V, are shown in the following table, wherein $m$ is the average number of repeating units in the polymer chain and "Shell" W.P. is the weld point under the "Shell Four Ball Test":

TABLE

| Example | $x+y$ | $nx$ avg. | $m$ avg. | "Falex Test" | | "Shell" W.P. (kg.) | ASTM Slope |
|---|---|---|---|---|---|---|---|
| | | | | Jaw Load (lb.) | Torque (lb.) | | |
| III-B | 4 | 1.5 | 4.5 | 1,100 | 70 | | |
| III-A | 4 | 3.76 | 4.5 | 2,000 | 50 | | |
| V-A | 4 | 2 | 15 | 1,350 | 80-100 | 158 | 0.328 |
| V-B | 4 | 3 | 15 | 3,400 | 70 | 178 | 0.449 |

In contrast, the cyclic products prepared according to Examples I and II are poor lubricants, failing in the "Falex Test" at jaw loads of 250 lbs. or less. The products chosen for comparison in this example were selected because of their close resemblance to each other in the number of polyfluoroalkyl units and in their molecular weights.

EXAMPLE VII

By the procedure of Example I, 120 g. of poly(dimethyl siloxane) having a viscosity of 10 cs. at 25° C., 0.4 g. of di-tert.-butyl peroxide, and 17 g. of tetrafluoroethylene were charged into the reactor. The reactor and its contents were then heated under agitation to 130° C. and held at this temperature for four hours. The reactor was then allowed to cool to room temperature, cooled further in a carbon dioxide-acetone bath, and charged with a second 17 g. portion of tetrafluoroethylene. After heating and agitating the reactor at 130° C. for about two hours, when the pressure was observed to have dropped to about zero p.s.i.g., the reactor was again cooled and charged with a third 17 g. portion of tetrafluoroethylene. After a final two-hour period of heating and agitating at 130° C., the reactor was cooled, vented, and discharged. The nearly colorless, slightly turbid reaction product was heated to 300° C., cooled to 100° C., and filtered. The resultant polyfluoroalkyl siloxane filtrate contained 32.1% carbon, 6.5% hydrogen, and 25.4% fluorine, corresponding to an average of about 5 tetrafluoroethylene units per molecule of poly(dimethyl siloxane). An examination of the product as a lubricant in the Falex Test gave a maximum load at failure of 550 lbs. The starting poly(dimethyl siloxane) gave a Falex Test value of less than 250 lbs.

A silicone fluid of structure

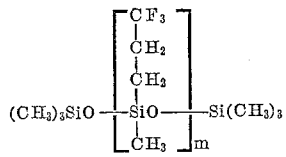

with a viscosity of 250 cs. gave a weld point of 158 kg. in the "Shell Four Ball Test." Also, the poly(dimethyl siloxane), having a molecular weight of about 2100, fails in the "Falex Test" at less than 250 lbs.

It will be understood that the preceding examples have been given for illustrative purposes solely and that this invention is not limited to the specific embodiments described therein. On the other hand, it will be readily apparent to those skilled in the art that, subject to the limitations set forth in the general description, many variations can be made in the materials, conditions, and techniques employed, without departing from the spirit or scope of this invention.

From the preceding description, it will be apparent that this invention provides a class of novel compounds and mixtures of compounds which have greatly improved lubricating properties over related products of the prior art and particularly are effective lubricants that carry very materially higher bearing loads. Also, this invention provides a novel method for producing polyfluoroalkyl-substituted linear polysiloxanes of novel and improved structure and makes it possible to control the number, size and position of the polyfluoroalkyl groups and the molecular weight of the products to meet the requirements of specific applications. Accordingly, it is believed to be apparent that this invention constitutes a valuable contribution to and advance in the art.

The embodiments of the invention in which an exclusive property or privilege is claimed are defined as follows:

1. A composition consisting essentially of at least one polyfluoroalkyl-substituted linear polysiloxane consisting of a polymer chain of from 2 to about 30 repeating units each of which consists of $x$ groups of the formula

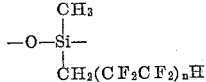

and $y$ groups of the formula

wherein $n$ is an integer of from 1 to 5, $x$ is an integer of from 1 to 2, the sum of $x$ and $y$ is an integer of from 3 to 4, and the average value of $nx$ is from 1 to 5, which chain is terminated at one end by a $(CH_3)_3Si$— group attached to oxygen at the other end by a $-O-Si(CH_3)_3$ group attached to silicon.

2. A composition consisting essentially of at least one polyfluoroalkyl-substituted linear polysiloxane consisting of a polymer chain of from 2 to about 30 repeating units each of which consists of $x$ groups of the formula

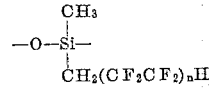

and $y$ groups of the formula

wherein $n$ is an integer of from 1 to 5, $x$ is an integer from 1 to 2, the sum of $x$ and $y$ is 4, and the average value of $nx$ is from 1 to 5, which chain is terminated at one end by a $(CH_3)_3Si$— group attached to oxygen and at the other end by a $-O-Si(CH_3)_3$ group attached to silicon.

3. A composition consisting essentially of at least one polyfluoroalkyl-substituted linear polysiloxane consisting of a polymer chain of from about 4 to about 15 repeating units each of which consists of $x$ groups of the formula

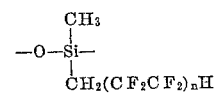

and $y$ groups of the formula

wherein $n$ is an integer of from 1 to 5, $x$ is an integer of from 1 to 2, the sum of $x$ and $y$ is 4, and the average value of $nx$ is from about 1.5 to about 4, which chain is terminated at one end by a $(CH_3)_3Si$— group attached to oxygen and at the other end by a $-O-Si(CH_3)_3$ group attached to silicon.

4. A composition consisting essentially of a mixture of polyfluoroalkyl-substituted linear polysiloxanes each of which consists of a polymer chain of from 2 to about 30 repeating units each of which consists of $x$ groups of the formula

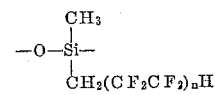

and $y$ groups of the formula

wherein $n$ is an integer of from 1 to 5, $x$ is an integer of from 1 to 2, the sum of $x$ and $y$ is an integer of from 3 to 4, and the average value of $nx$ is from 1 to 5, which chain is terminated at one end by a $(CH_3)_3Si$— group attached to oxygen and at the other end by a $$-O-Si(CH_3)_3$$

group attached to silicon.

5. A composition consisting essentially of a mixture of polyfluoroalkyl-substituted linear polysiloxanes each of which consists of a polymer chain of from about 4 to about 15 repeating units each of which consists of $x$ groups of the formula

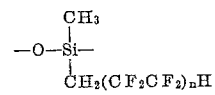

and $y$ groups of the formula

wherein $n$ is an integer of from 1 to 5, $x$ is an integer of from 1 to 2, the sum of $x$ and $y$ is 4, and the average value of $nx$ is from about 1.5 to about 4, which chain is terminated at one end by a $(CH_3)_3Si$— group attached to oxygen and at the other end by a $-O-Si(CH_3)_3$ group attached to silicon.

6. The process for preparing polyfluoroalkyl-substituted polysiloxanes which comprises treating a polyfluoroalkyl-substituted cyclicpolysiloxane which consists of $x$ groups of the formula

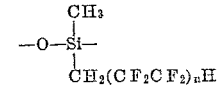

and y groups of the formula

wherein n is an integer of from 1 to 5, x is an integer of from 1 to 2, the sum of x and y is an integer of from 3 to 4, and the average value of the product of nx is from 1 to 5, with a concentrated aqueous strong nonoxidizing inorganic acid of the group consisting of concentrated hydrochloric acid, concentrated hydrobromic acid, sulfuric acid of from about 75% to about 90% concentration, and phosphoric acid of from about 70% to about 80% concentration, at a temperature of from about 25° C. to about 150° C. to cleave the ring of the cyclicpolysiloxane and cause the cleaved products to form polymeric chains, and reacting the polymeric product with from about 0.01 to about 0.1 mole of a member of the group consisting of trimethyl chlorosilane and hexamethyldisiloxane at a temperature of from about 90° C. to about 110° C., and recovering from the reaction mixture at least one polyfluoroalkyl-substituted linear polysiloxane which consists of a polymer chain of from 2 to about 30 repeating units each of which consists of x groups of the formula

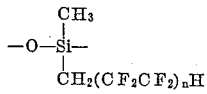

and y groups of the formula

wherein n, x, x+y and nx have the above designated values, which chain is terminated at one end by a (CH$_3$)$_3$Si- group attached to oxygen and at the other end by a —O—Si(CH$_3$)$_3$ group attached to silicon.

7. The process for preparing polyfluoroalkyl-substituted polysiloxanes which comprises treating a polyfluoroalkyl-substituted cyclicpolysiloxane which consists of x groups of the formula

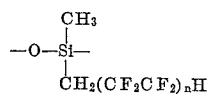

and y groups of the formula

wherein n is an integer of from 1 to 5, x is an integer of from 1 to 2, the sum of x and y is 4, and the average value of the product of nx is from 1 to 5, with a concentrated aqueous strong nonoxidizing inorganic acid of the group consisting of concentrated hydrochloric acid, concentrated hydrobromic acid, sulfuric acid of from about 75% to about 90% concentration, and phosphoric acid of from about 70% to about 80% concentration, at a temperature of from about 25° C. to about 150° C. to cleave the ring of the cyclicpolysiloxane and cause the cleaved products to form polymeric chains, and reacting the polymeric product with from about 0.01 to about 0.1 mole of a member of the group consisting of trimethyl chlorosilane and hexamethyldisiloxane at a temperature of from about 90° C. to about 110° C., and recovering from the reaction mixture at least one polyfluoroalkyl-substituted linear polysiloxane which consists of a polymer chain of from 2 to about 30 repeating units each of which consists of x groups of the formula

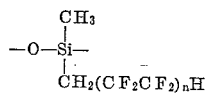

and y groups of the formula

wherein n, x, x+y and nx have the above designated values, which chain is terminated at one end by a (CH$_3$)$_3$Si— group attached to oxygen and at the other end by a —O—Si(CH$_3$)$_3$ group attached to silicon.

8. The process for preparing polyfluoroalkyl-substituted polysiloxanes which comprises treating a polyfluoroalkyl-substituted cyclicpolysiloxane which consists of x groups of the formula

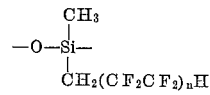

and y groups of the formula

wherein n is an integer of from 1 to 5, x is an integer of from 1 to 2, the sum of x and y is 4, and the average value of the product of nx is from about 1.5 to about 4, with a concentrated aqueous strong nonoxidizing inorganic acid of the group consisting of concentrated hydrochloric acid, concentrated hydrobromic acid, sulfuric acid of from about 75% to about 90% concentration, and phosphoric acid of from about 70% to about 80% concentration, at a temperature of from about 25° C. to about 150° C. to cleave the ring of the cyclicpolysiloxane and cause the cleaved products to form polymeric chains, and reacting the polymeric product with from about 0.01 to about 0.1 mole of a member of the group consisting of trimethyl chlorosilane and hexamethyldisiloxane at a temperature of from about 90° C. to about 110° C., and recovering from the reaction mixture at least one polyfluoroalkyl-substituted linear polysiloxane which consists of a polymer chain of from about 4 to about 15 repeating units each of which consists of x groups of the formula

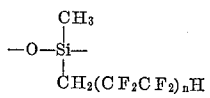

and y groups of the formula

wherein n, x x+y and nx have the above designated values, which chain is terminated at one end by a (CH$_3$)$_3$Si— group attached to oxygen and at the other end by a —O—Si(CH$_3$)$_3$ group attached to silicon.

9. The process for preparing polyfluoroalkyl-substituted polysiloxanes which comprises treating a polyfluoroalkyl-substituted cyclicpolysiloxane which consists of x groups of the formula

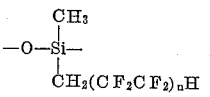

and y groups of the formula

wherein n is an integer of from 1 to 5, x is an integer of from 1 to 2, the sum of x and y is an integer of from 3 to 4, and the average value of the product of nx is from 1 to 5, with concentrated aqueous hydrochloric acid at a temperature of from about 25° C. to about 150° C. to cleave the ring of the cyclicpolysiloxane and cause the cleaved products to form polymeric chains, and reacting the polymeric product with from about 0.01 to about 0.1 mole of trimethyl chlorosilane at a temperature of from about 90° C. to about 110° C., and recovering from the reaction mixture at least one polyfluoroalkyl-substituted linear polysiloxane which consists of a polymer chain of from 2 to about 30 repeating units each of which consists of $x$ groups of the formula

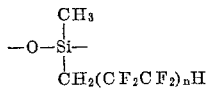

and $y$ groups of the formula

wherein $n$, $x$, $x+y$ and $nx$ have the above designated values, which chain is terminated at one end by a $$(CH_3)_3Si—$$

group attached to oxygen and at the other end by a $$—O—Si(CH_3)_3$$

group attached to silicon.

10. The process for preparing polyfluoroalkyl-substituted polysiloxanes which comprises treating a polyfluoralkyl-substituted cyclicpolysiloxane which consists of $x$ groups of the formula

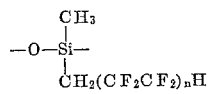

and $y$ groups of the formula

wherein $n$ is an integer of from 1 to 5, $x$ is an integer of from 1 to 2, the sum of $x$ and $y$ is 4, and the average value of the product of $nx$ is from about 1.5 to about 4, with concentrated aqueous hydrochloric acid at a temperature of from about 25° C. to about 150° C. to cleave the ring of the cyclicpolysiloxane and cause the cleaved products to form polymeric chains, and reacting the polymeric product with from about 0.01 to about 0.1 mole of trimethyl chlorosilane at a temperature of from about 90° C. to about 110° C., then heating the product with aqueous sulfuric acid having a concentration of from about 75% to about 90% at a temperature of about 90° C., and recovering from the reaction mixture a mixture of polyfluoroalkyl-substituted linear polysiloxanes each of which consists of a polymer chain of from about 4 to about 15 repeating units each of which consists of $x$ groups of the formula

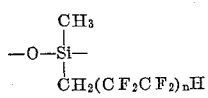

and $y$ groups of the formula

wherein $n$, $x$, $x+y$ and $nx$ have the above designated values, which chain is terminated at one end by a $$(CH_3)_3Si—$$

group attached to oxygen and at the other end by a $$—O—Si(CH_3)_3$$

group attached to silicon.

11. The process for preparing polyfluoroalkyl-substituted polysiloxanes which comprises treating a polyfluoroalkyl-substituted cyclicpolysiloxane which consists of $x$ groups of the formula

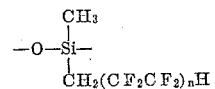

and $y$ groups of the formula

wherein $n$ is an integer of from 1 to 5, $x$ is an integer of from 1 to 2, the sum of $x$ and $y$ is an integer of from 3 to 4, and the average value of the product of $nx$ is from 1 to 5, with aqueous sulfuric acid having a concentration of from about 75% to about 90% at a temperature of from about 25° C. to about 150° C. in the presence of from about 0.01 to about 0.1 mole of hexamethyldisiloxane, and recovering from the reaction mixture at least one polyfluoroalkyl-substituted linear polysiloxane which consists of a polymer chain of from 2 to about 30 repeating units each of which consists of $x$ groups of the formula

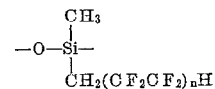

and $y$ groups of the formula

wherein $n$, $x$, $x+y$ and $nx$ have the above designated values, which chain is terminated at one end by a $$(CH_3)_3Si—$$

group attached to oxygen and at the other end by a $$—O—Si(CH_3)_3$$

group attached to silicon.

12. The process for preparing polyfluoroalkyl-substituted polysiloxanes which comprises treating a polyfluoroalkyl-substituted cyclopolysiloxane which consists of $x$ groups of the formula

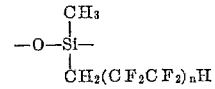

and $y$ groups of the formula

wherein $n$ is an integer of from 1 to 5, $x$ is an integer of from 1 to 2, the sum of $x$ and $y$ is 4, and the average value of the product of $nx$ is from 1 to 5, with aqueous sulfuric acid having a concentration of from about 75% to about 90% at a temperature of from about 95° C. to about 100° C. in the presence of from about 0.01 to about 0.1 mole of hexamethyldisiloxane, and recovering from the reaction mixture at least one polyfluoroalkyl-substituted linear polysiloxane which consists of a polymer chain of from 2 to about 30 repeating units each of which consists of $x$ groups of the formula

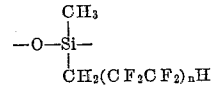

and $y$ groups of the formula

wherein $n$, $x$, $x+y$ and $nx$ have the above designated values, which chain is terminated at one end by a $$(CH_3)_3Si-$$

group attached to oxygen and at the other end by a O—Si(CH$_3$)$_3$ group attached to silicon.

13. The process for preparing polyfluoroalkyl-substituted polysiloxanes which comprises treating a mixture of cyclicpolysiloxanes consisting essentially of polyfluoroalkyl-substituted cyclicpolysiloxanes each of which consists of $x$ groups of the formula $$-O-\underset{\underset{CH_2(CF_2CF_2)_nH}{|}}{\overset{\overset{CH_3}{|}}{Si}}-$$

and $y$ groups of the formula $$-O-\underset{\underset{CH_3}{|}}{\overset{\overset{CH_3}{|}}{Si}}-$$

wherein $n$ is an integer of from 1 to 5, $x$ is an integer of from 1 to 2, the sum of $x$ and $y$ is 4, and the average value of the product of $nx$ is from 1 to 5, with aqueous sulfuric acid having a concentration of from about 75% to about 90% at a temperature of from about 95° C. to about 100° C. in the presence of from about 0.01 to about 0.1 mole of hexamethyldisiloxane, and recovering from the reaction mixture a mixture consisting essentially of polyfluoroalkyl-substituted linear polysiloxanes each of which consists of a polymer chain of from 2 to about 30 repeating units each of which consists of $x$ groups of the formula $$-O-\underset{\underset{CH_2(CF_2CF_2)_nH}{|}}{\overset{\overset{CH_3}{|}}{Si}}-$$

and $y$ groups of the formula $$-O-\underset{\underset{CH_3}{|}}{\overset{\overset{CH_3}{|}}{Si}}-$$

wherein $n$, $x$, $x+y$ and $nx$ have the above designated values, which chain is terminated at one end by a $$(CH_3)_3Si-$$

group attached to oxygen and at the other end by a —O—Si(CH$_3$)$_3$ group attached to silicon.

14. The process for preparing polyfluoroalkyl-substituted polysiloxanes which comprises treating a mixture of cyclicpolysiloxanes consisting essentially of polyfluoroalkyl-substituted cyclicpolysiloxanes each of which consists of $x$ groups of the formula $$-O-\underset{\underset{CH_2(CF_2CF_2)_nH}{|}}{\overset{\overset{CH_3}{|}}{Si}}-$$

and $y$ groups of the formula $$-O-\underset{\underset{CH_3}{|}}{\overset{\overset{CH_3}{|}}{Si}}-$$

wherein $n$ is an integer of from 1 to 5, $x$ is an integer of from 1 to 2, the sum of $x$ and $y$ is 4, and the average value of the product of $nx$ is from about 1.5 to about 4, with aqueous sulfuric acid having a concentration of from about 75% to about 90% at a temperature of from about 95° C. to about 100° C. in the presence of from about 0.01 to about 0.1 mole hexamethyldisiloxane, and recovering from the reaction mixture a mixture consisting essentially of polyfluoroalkyl-substituted linear polysiloxanes each of which consists of a polymer chain of from about 4 to about 15 repeating units each of which consists of $x$ groups of the formula $$-O-\underset{\underset{CH_2(CF_2CF_2)_nH}{|}}{\overset{\overset{CH_3}{|}}{Si}}-$$

and $y$ groups of the formula $$-O-\underset{\underset{CH_3}{|}}{\overset{\overset{CH_3}{|}}{Si}}-$$

wherein $n$, $x$, $x+y$ and $nx$ have the above designated values, which chain is terminated at one end by a $$(CH_3)_3Si-$$

group attached to oxygen and at the other end by a —O—Si(CH$_3$)$_3$ group attached to silicon.

References Cited in the file of this patent

UNITED STATES PATENTS

| | | |
|---|---|---|
| 2,469,888 | Patnode | May 10, 1949 |
| 2,958,707 | Warrick | Nov. 1, 1960 |
| 3,012,051 | Schnürrbusch et al. | Dec. 5, 1961 |

FOREIGN PATENTS

| | | |
|---|---|---|
| 1,067,598 | Germany | Oct. 22, 1959 |